(12) United States Patent
Flint

(10) Patent No.: US 7,409,855 B2
(45) Date of Patent: Aug. 12, 2008

(54) ENGINE HEALTH MONITORING

(75) Inventor: Paul A. Flint, Derby (GB)

(73) Assignee: Rolls-Royce plc, London (GB)

( * ) Notice: Subject to any disclaimer, the term of this patent is extended or adjusted under 35 U.S.C. 154(b) by 92 days.

(21) Appl. No.: 11/603,987

(22) Filed: Nov. 24, 2006

(65) Prior Publication Data

US 2007/0144246 A1    Jun. 28, 2007

(30) Foreign Application Priority Data

Dec. 23, 2005    (GB) ................................. 0526330.6

(51) Int. Cl.
*G01M 15/00* (2006.01)
(52) U.S. Cl. .................................................. 73/118.1
(58) Field of Classification Search ................... 73/112, 73/113, 115, 116, 117.2, 117.3, 117.4, 118.1, 73/119 A
See application file for complete search history.

(56) References Cited

U.S. PATENT DOCUMENTS

| | | | |
|---|---|---|---|
| 6,672,145 B2 * | 1/2004 | Mitchell et al. | 73/118.1 |
| 6,672,147 B1 | 1/2004 | Mazet | |
| 6,782,317 B2 * | 8/2004 | Mitchell et al. | 701/100 |
| 7,251,925 B2 * | 8/2007 | Paradise | 60/39.281 |
| 2003/0056578 A1 * | 3/2003 | Mitchell et al. | 73/116 |
| 2006/0080961 A1 * | 4/2006 | Paradise | 60/734 |
| 2007/0089499 A1 * | 4/2007 | Muramatsu et al. | 73/116 |

FOREIGN PATENT DOCUMENTS

| | | |
|---|---|---|
| EP | 1 061 243 A2 | 12/2000 |
| WO | WO 99/39801 A1 | 8/1999 |

\* cited by examiner

*Primary Examiner*—Eric S McCall
(74) *Attorney, Agent, or Firm*—Oliff & Berridge, PLC

(57) ABSTRACT

The present invention is a method of monitoring the health of a fuel system 30 of a gas turbine engine 10. The fuel system 30 comprising a fuel-metering valve 36, a hydraulic control valve servo pressure line 40 and a control pressure line 39. The fuel-metering valve comprises a hydraulic control valve solenoid 36 for metering the flow of fuel and a fuel filter 38 and, in use, a current is applied to the solenoid 38 to control the required fuel demand to fuel nozzles 25. The method comprises the steps of; measuring either the percentage difference between fuel metering valve demand and actual positions or the percentage difference in pressure between the servo pressure line 40 and the control pressure line 39, comparing the differential to a predetermined level, when that predetermined level is reached a warning is given. Thereby the engine may be scheduled for service before unsatisfactory performance of the fuel system is experienced.

8 Claims, 4 Drawing Sheets

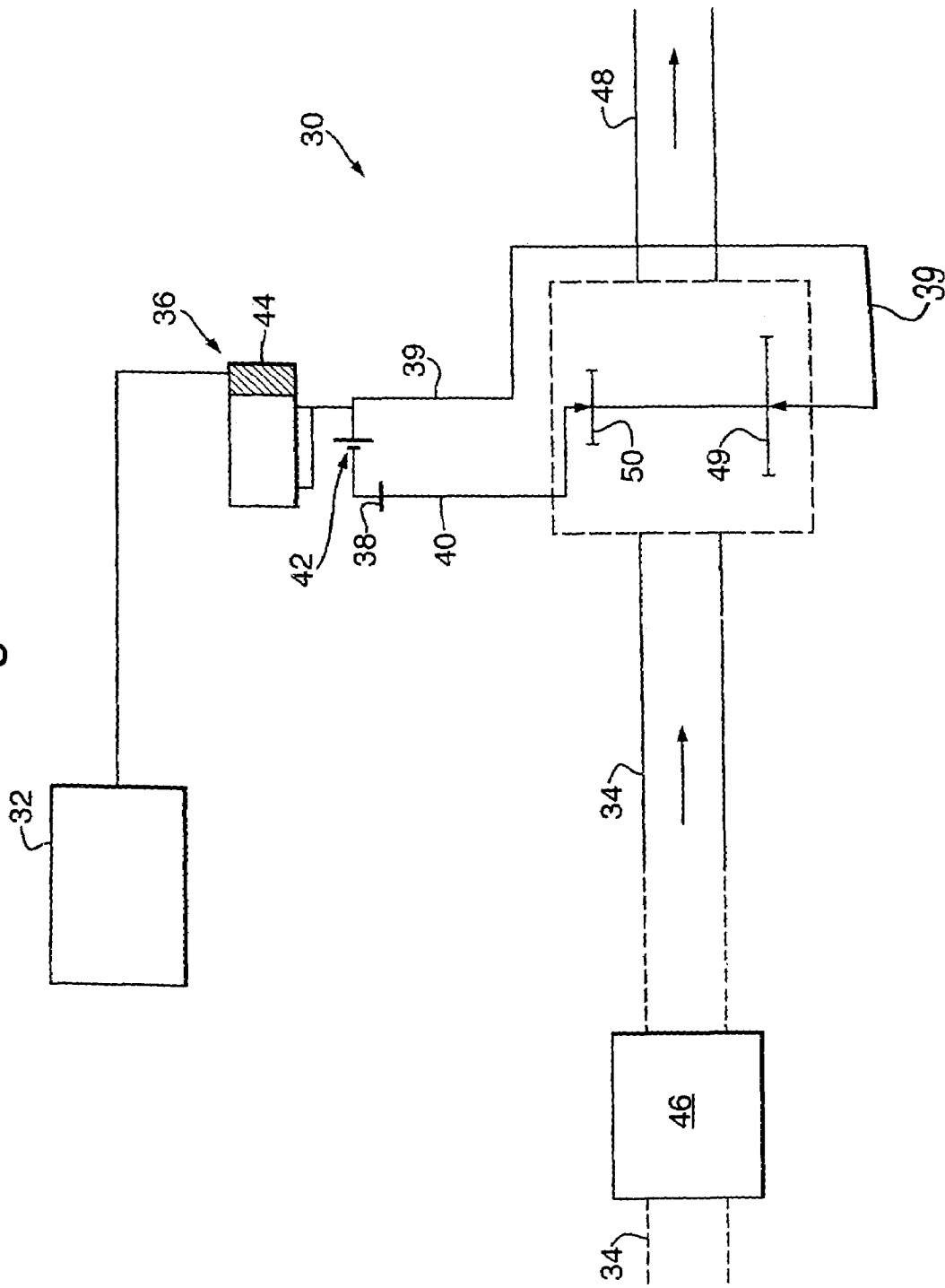

ENGINE HEALTH MONITORING

This invention relates to health monitoring of gas turbine engines.

Some conventional gas turbine engines use a fuel-metering valve to regulate the flow of fuel to the combustion equipment dependent on required power output. The fuel metering valve position is set using fuel pressure that is controlled by a hydraulic control valve. Under normal operation, and to maintain a fixed FMV position, a current is applied to a hydraulic control valve solenoid. During service operation and for example, the hydraulic control valve inlet fuel filter can become blocked with particles in the fuel. This leads to a progressive increase in the current at the control valve solenoid. An Engine Electronic Controller (EEC) monitors the fuel metering valve's current continuously. The EEC then issues a fault message when the current increases to a certain limit. This limit maintains the integrity of the fuel metering valve control system.

However, a disadvantage of this conventional system is that there is no indication of a potential fault prior to the fault message being sent of any increase in the current at the hydraulic control valve. Thus the prior system and method only indicates when the control valve solenoid has reached the safe limit of operation. At this point the aircraft cannot despatch until, in this case, the fuel filter has been replaced.

Furthermore, this conventional system (EEC, fuel metering valve and hydraulic control valve current) is not output as a parameter within the aircraft health monitoring system. Thus this system does not allow monitoring of the increase in current to be carried out prior to the "do not despatch" message being sent and hence does not allow fleet management (i.e. prioritised unit removal) to be carried out.

The object of the present invention is therefore to provide an indication of non-operability of a gas turbine engine prior to a problem occurring. A further object of the present invention is to enable fleet management and prioritisation of potential problems and their repair.

According to the invention, there is provided a method of monitoring the health of a fuel system, the fuel system comprising a fuel metering valve, a hydraulic control valve servo pressure line and a control pressure line, the fuel metering valve comprises a hydraulic control valve solenoid for metering the flow of fuel and a fuel filter, in use a current is applied to the solenoid to control the required fuel demand; the method comprising the steps of; measuring either the percentage difference between fuel metering valve demand and fuel metering valve actual position or the percentage difference in pressure between the servo pressure line and the control pressure line, comparing the differential to a predetermined level, when that predetermined level is reached a warning is given.

Preferably, the fuel system comprises a predetermined level between 0.5% and 3.5%. Preferentially the fuel system comprises a predetermined level between 1.0% and 3.0%. The most suitable predetermined level is greater than 1%.

The method of monitoring the health of a fuel system preferably comprise the further step of servicing the fuel system when a warning is given.

Preferably, the warning is indicative of a fuel filter blockage or partial blockage.

The present invention is preferably applicable to a plurality of fuel systems as claimed above and here comprises the further step of prioritising servicing each fuel system dependent on the highest measured percentage differential.

The present invention also provides a method of operating a gas turbine engine comprising a fuel system as described in the above paragraphs.

Embodiments of the invention will now be described by way of example only, with reference to the accompanying diagrammatic drawings, in which:

FIG. 4 is a more detailed diagram of the fuel system of the present invention.

Figure 1:
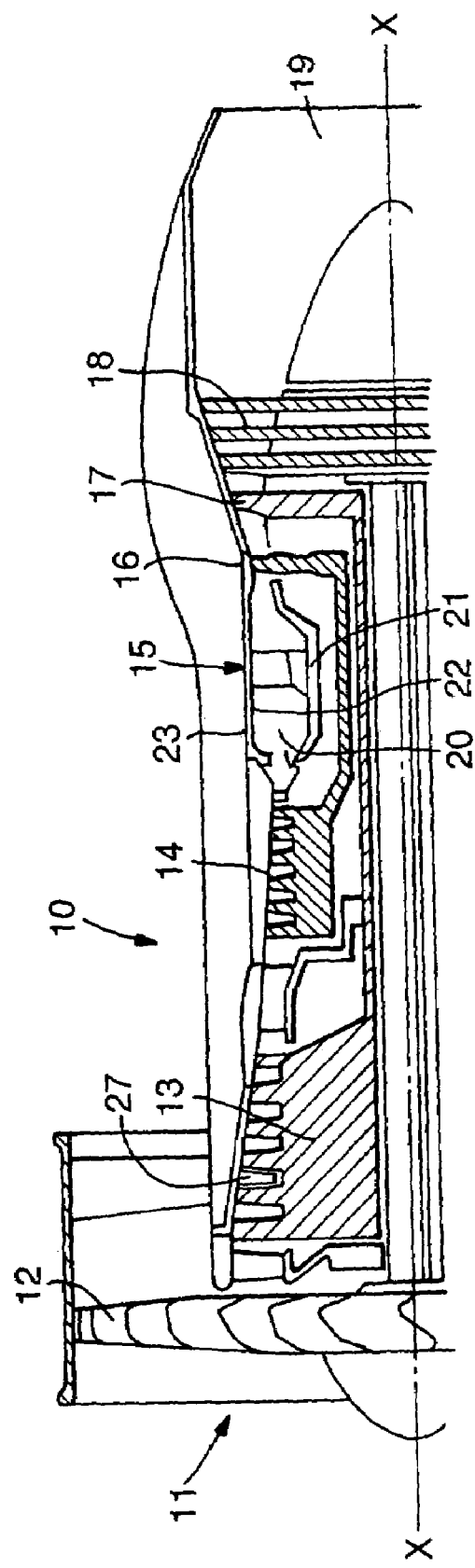
FIG. 1 is a sectional side view of a gas turbine engine.

With reference to FIG. 1, a gas turbine engine is generally indicated at 10 and comprises, in axial flow series, an air intake 11, a propulsive fan 12, an intermediate pressure compressor 13, a high pressure compressor 14, combustion equipment 15, a high pressure turbine 16, an intermediate pressure turbine 17, a low pressure turbine 18 and an exhaust nozzle 19.

The gas turbine engine 10 works in the conventional manner so that air entering the intake 11 is accelerated by the fan to produce two air flows: a first air flow into the intermediate pressure compressor 13 and a second air flow which provides propulsive thrust. The intermediate pressure compressor 13 compresses the airflow directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive, the high, intermediate and low-pressure turbine 16, 17 and 18 before being exhausted through the nozzle 19 to provide additional propulsive thrust. The high, intermediate and low-pressure turbines 16, 17 and 18 respectively drive the high and intermediate pressure compressors 14 and 13 and the fan 12 by suitable interconnecting shafts.

Figure 2:
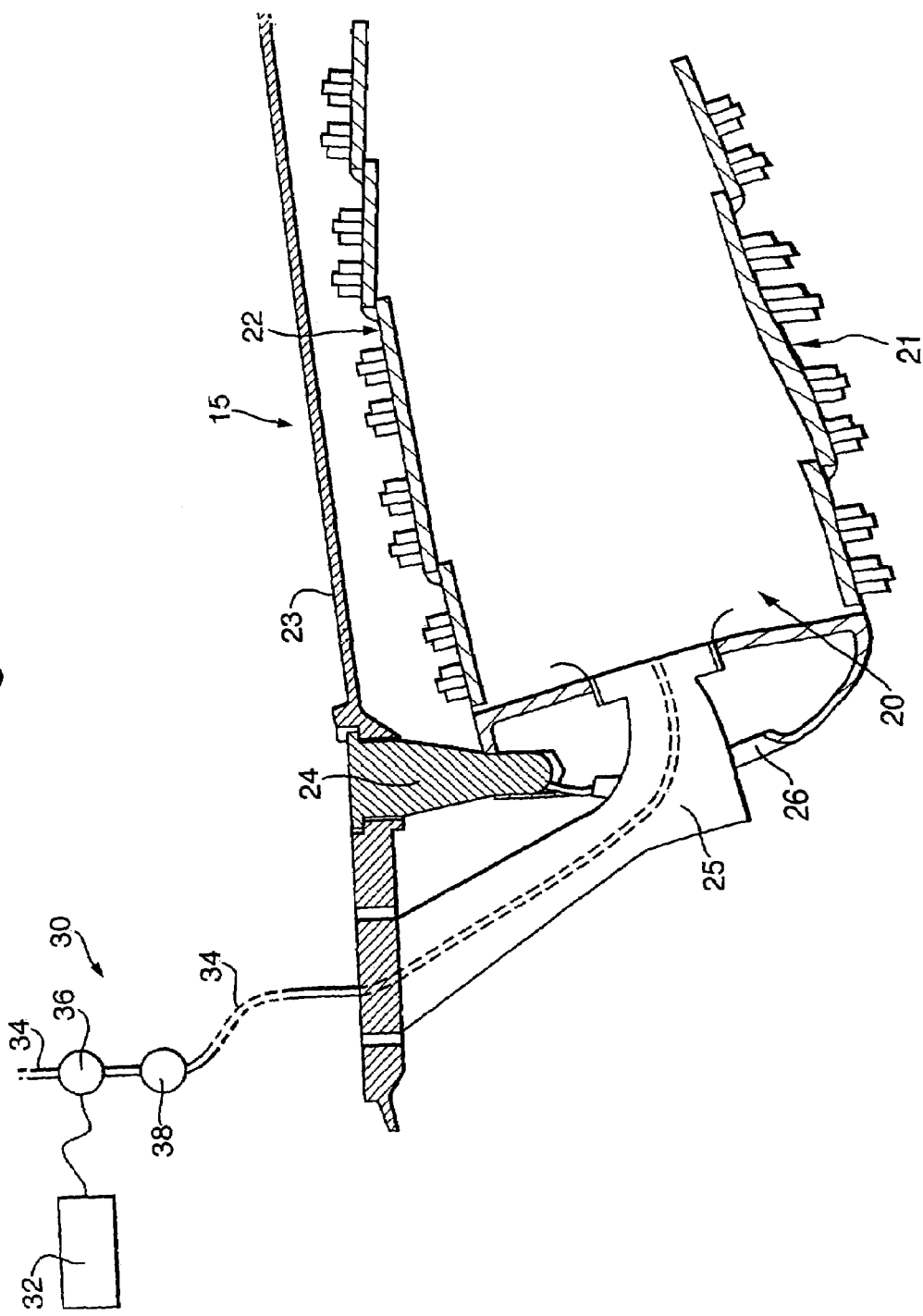
FIG. 2 is a sectional side view of part of a combustor of the engine shown in FIG. 1 incorporating a fuel system in accordance with the present invention.

Referring to FIG. 2, the combustor 15 is constituted by an annular combustion chamber 20 having radially inner and outer double wall structures 21 and 22 respectively. The combustor 15 is secured to a wall 23 by a plurality of pins 24 (only one of which is shown). Fuel is directed into the chamber 20 through a number of fuel nozzles 25 located at the upstream end 26 of the chamber 20. The fuel nozzles are circumferentially spaced around the engine 10 and serve to spray fuel into air derived from the high-pressure compressor 14. The resultant fuel/air mixture is then combusted within the chamber 20.

With reference to FIGS. 2 and 4, the fuel is delivered to the fuel nozzles 25 via a fuel system 30. The fuel system 30 comprises a fuel tank (not shown) and a fuel pump 46 and a fuel line 34, a fuel-metering valve (FMV) 36 incorporating a hydraulic control valve solenoid 44 and a fuel filter 38. The fuel system 30 also comprises a servo line 40, incorporating the filter 38 and a restrictor 42, and a control line 39. The servo line 40 and control line are arranged in flow communication with the fuel-metering valve 36. The servo line 40 and the control line 39 each pass through respective valves 50, 49. The valve 50 is more restrictive to flow than valve 49 such that a pressure difference is maintained to ensure fuel flow in the fuel lines 40, 39 to the fuel nozzles 25.

An Engine Electronic Controller (EEC) 32 monitors and controls the engine's functioning and in particular the fuel flow requirements to the fuel nozzles 25 via pipe 48. The EEC 32 regulates the position of the solenoid 44, so as to vary the fuel flow according to demand, by applying a current thereto. The EEC monitors the fuel metering valve's hydraulic valve solenoid 44 current continuously.

The present invention uses the relationship between fuel metering valve 36 demand position (FMVD) and the current applied to the fuel metering valve's hydraulic control valve solenoid 44. When this hydro-mechanical unit (36, 44, 38) has an internal fault, such as hydraulic control valve fuel filter 38 blockage, the pressure differential between the hydraulic control valve servo line 40 and control line 39 changes. The change in internal fuel pressure between the servo line 40 and the control line 39 requires the hydraulic control metering valve 36 to open to re-establish the same pressure differential between the servo and control lines 40, 39. Maintaining the pressure differential is essential to the correct operation of the fuel metering valve 36.

The action of opening and holding the hydraulic control valve 36 further open requires the current at the control valve solenoid 44 to increase. As the pressure differential increases (in this case with increased filter blockage) the hydraulic control valve 44 has to open further to restore the required pressure differential. This leads to a further increase in current at the hydraulic control valve solenoid 44.

As the hydraulic control valve 36 is in a different position relative to the original design intent (or normal operation range), the relationship between demanded and actual fuel metering valve 36 position is also different to design intent. Therefore monitoring and knowing the position of the solenoid 44 the change in fuel pump performance can be monitored via the aircraft's health monitoring system.

Figure 3:
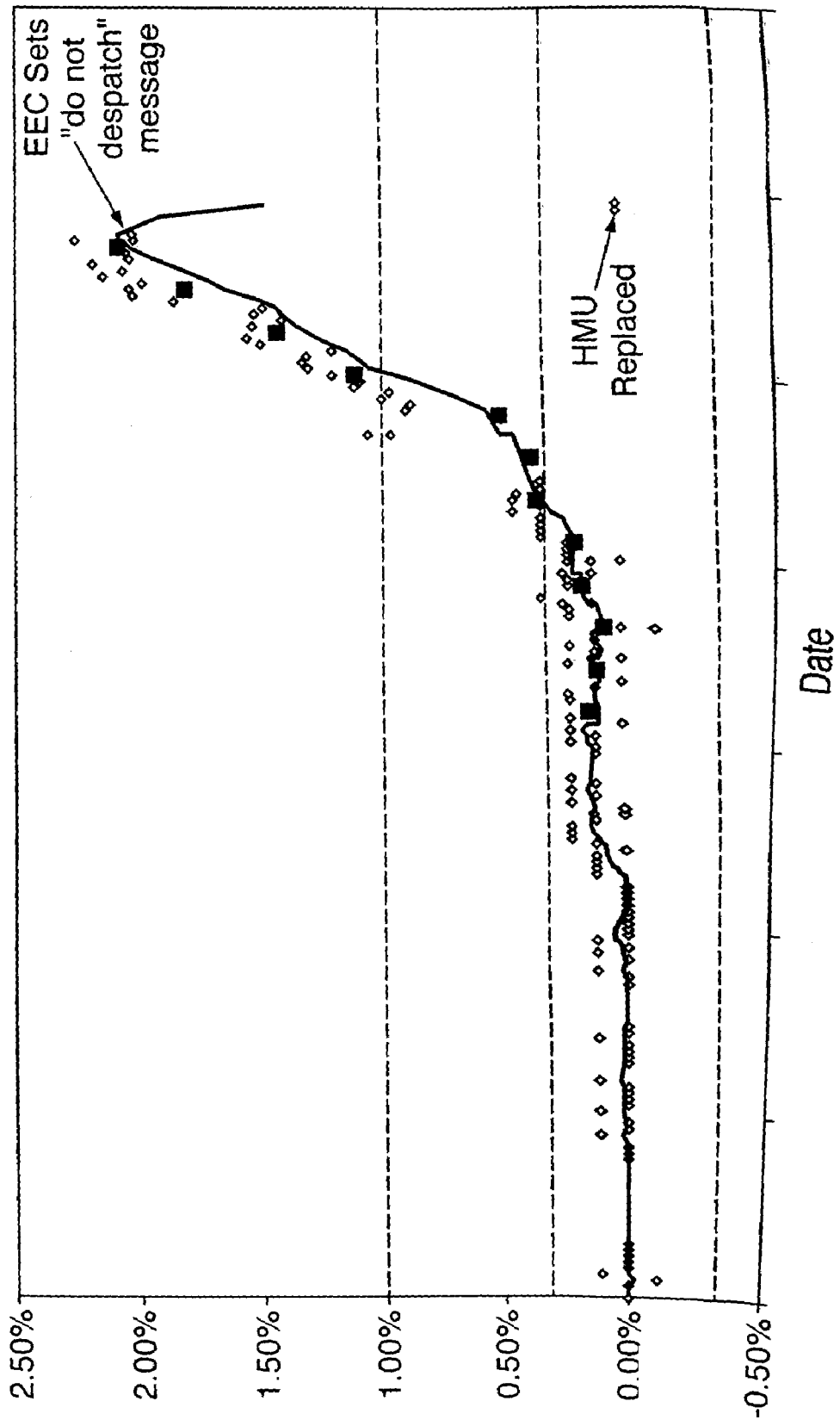
FIG. 3 is an example plot of the percentage difference between fuel metering valve actual position and demanded position (y-axis) against time (x-axis)

FIG. 3 shows an example plot of the percentage FMV/FMVD (y-axis) against time (x-axis). The demanded and actual FMV position is output by the engine 10 on every flight, and this invention allows monitoring of the percentage difference between the FMVD and the actual FMV position. As this relationship is directly related to the increase in current at the fuel metering valve control valve solenoid 36, continuous monitoring of current increase can now be carried out.

From experimental experience "do not despatch" messages have been predetermined when the percentage FMV/FMVD is between 0.5% and 3.5%, however, a range of 1.1% to 3.0% is proving preferable for increased accuracy. In testing by the applicant, all units removed and inspected have had control valve filter blockage greater than 75%.

Using this knowledge, any HMU's exceeding a limit of 1.0% will be removed from service and cleaned/inspected. The limit of 1.0% is based on a ten flight average which is has been proven to be the most statistically appropriate i.e. it represents 10 aircraft take off points, which, from experience, best accounts for problems with data scatter/noise.

Thus the present invention includes a method of monitoring the health of a fuel system 30 of a gas turbine engine 10. The fuel system 30 comprises the fuel-metering valve 36, the fuel filter 38, the hydraulic control valve servo pressure line servo and the control pressure line. The fuel-metering valve 36 comprises a hydraulic control valve solenoid for metering the flow of fuel through fuel line 34. In use, the EEC applies a current to the solenoid to control the required fuel demand through the valve 36. The method comprises the steps of measuring the pressure differential between the hydraulic control valve servo pressure line and the control pressure line, comparing the pressure differential to a predetermined level, when that predetermined level is reached a warning is given. In this embodiment of the present invention the warning is indicative of a fuel filter blockage or partial blockage and once the warning is given the fuel system is serviced of scheduled to be serviced (e.g. the filter cleaned). Such scheduling may be based on a fleet requirement and comprises prioritising servicing of each engine's fuel system dependent on the highest measured pressure differential.

In summary, the present invention is a method of monitoring the health of a fuel system 30 of a gas turbine engine 10. The fuel system 30 comprising a fuel-metering valve 36, a hydraulic control valve servo pressure line 40 and a control pressure line 39. The fuel-metering valve comprises a hydraulic control valve solenoid 36 for metering the flow of fuel and a fuel filter 38 and, in use, a current is applied to the solenoid 38 to control the required fuel demand to fuel nozzles 25. The method comprises the steps of; measuring either the percentage difference between fuel metering valve demand and actual positions or the percentage difference in pressure between the servo pressure line 40 and the control pressure line 39, comparing the differential to a predetermined level, when that predetermined level is reached a warning is given. Thereby the engine may be scheduled for service before unsatisfactory performance of the fuel system is experienced.

Alternatively, this method can also be applied to monitoring a hydraulic system (equivalent to the fuel system 30 as herein before described) that controls variable stator vanes 27 within the compressors 13, 14 of the engine 10. The variable stator vanes are positioned at various operational points as known in the art via hydraulic pressure means. Therefore it is necessary to ensure adequate pressure supply. Thus to monitor the health of the hydraulic system, the metering valve demand and actual positions may be used in a similar way to indicate variable stator vane's hydraulic control valve fuel filter is contaminated.

I claim:

1. A method of monitoring the health of a fuel system, the fuel system comprising a fuel metering valve, a hydraulic control valve servo pressure line and a control pressure line, the fuel metering valve comprises a hydraulic control valve solenoid for metering the flow of fuel and a fuel filter, in use a current is applied to the solenoid to control the required fuel demand;

the method comprising the steps of;

measuring either the percentage difference between fuel metering valve demand and fuel metering valve actual position or the percentage difference in pressure between the servo pressure line and the control pressure line, comparing the differential to a predetermined level, when that predetermined level is reached a warning is given.

2. A method of monitoring the health of a fuel system as claimed in claim 1 comprising a predetermined level between 0.5% and 3.5%.

3. A method of monitoring the health of a fuel system as claimed in claim 1 comprising a predetermined level between 1.0% and 3.0%.

4. A method of monitoring the health of a fuel system as claimed in claim 1 comprising a predetermined level of greater than 1%.

5. A method of monitoring the health of a fuel system as claimed in claim 1 comprising the further step of servicing the fuel system when a warning is given.

6. A method of monitoring the health of a fuel system as claimed in claim 1 wherein the warning is indicative of a fuel filter blockage or partial blockage.

7. A method of monitoring the health of a plurality of fuel systems as claimed in claim 1 comprising the further step of prioritising servicing each fuel system (30) dependent on the highest measured percentage differential.

8. A method of operating a gas turbine engine comprising a fuel system, the method in accordance with claim 1.

* * * * *